United States Patent
Goel et al.

(10) Patent No.: US 11,403,727 B2
(45) Date of Patent: Aug. 2, 2022

(54) SYSTEM AND METHOD FOR CONVOLVING AN IMAGE

(71) Applicant: NXP USA, Inc., Austin, TX (US)

(72) Inventors: Amit Goel, Noida (IN); Atul Gupta, Noida (IN)

(73) Assignee: NXP USA, Inc., Austin, TX (US)

(*) Notice: Subject to any disclaimer, the term of this patent is extended or adjusted under 35 U.S.C. 154(b) by 387 days.

(21) Appl. No.: 16/775,225

(22) Filed: Jan. 28, 2020

(65) Prior Publication Data

US 2021/0233202 A1 Jul. 29, 2021

(51) Int. Cl.
| | |
|---|---|
| G06T 1/00 | (2006.01) |
| G06F 9/30 | (2018.01) |
| G06F 7/544 | (2006.01) |
| G06F 17/16 | (2006.01) |

(52) U.S. Cl.
CPC .......... *G06T 1/0007* (2013.01); *G06F 9/3001* (2013.01); *G06F 9/30043* (2013.01); *G06F 7/5443* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 6,151,025 A * | 11/2000 | Yen | G06T 5/20 345/615 |
| 7,085,795 B2 | 8/2006 | Debes et al. | |
| 8,832,004 B2 | 9/2014 | Kato et al. | |
| 9,519,460 B1 | 12/2016 | Farooqui et al. | |
| 9,697,463 B2 | 7/2017 | Ross et al. | |
| 10,176,551 B2 * | 1/2019 | Park | G06N 3/063 |
| 2016/0335082 A1 | 11/2016 | Sadeh et al. | |
| 2017/0024218 A1 | 1/2017 | Mahurin et al. | |
| 2017/0046153 A1 | 2/2017 | Mahurin | |
| 2018/0005074 A1 | 1/2018 | Shacham | |
| 2018/0137414 A1 | 5/2018 | Du et al. | |
| 2018/0181857 A1 * | 6/2018 | Mathew | G06N 3/0454 |

(Continued)

OTHER PUBLICATIONS

Coding for NEON—Part 3: Matrix Multiplication, Arm Community, retrieved from the internet, 10 pgs., Jan. 27, 2020 at: https://community.arm.com/developer/ip-products/processors/b/processors-ip-blog/posts/coding-for-neon---part-3-matrix-multiplication (Sep. 11, 2013).

(Continued)

*Primary Examiner* — Eric Coleman

(57) ABSTRACT

A system for convolving an image includes a processing circuitry that retrieves the image including a set of rows, and a set of kernels, and merges serially all columns of each kernel, to generate a merged kernel. The processing circuitry executes parallelly multiple times, a multiply-accumulate (MAC) instruction on a row loaded in a corresponding vector register and a corresponding coefficient of the merged kernel and a load instruction on a subsequent row in one clock cycle. In the same clock cycle based on the MAC instruction, a logical shift operation is executed on the merged kernel to shift a current coefficient of the merged kernel with a subsequent coefficient such that the MAC instruction is executed on the subsequent row and the subsequent coefficient in the next clock cycle. Thus, each clock cycle is utilized by the system for executing both the MAC and load instructions.

20 Claims, 10 Drawing Sheets

(56) References Cited

U.S. PATENT DOCUMENTS

2018/0203673 A1* 7/2018 Ravishankar ......... G06F 9/4494
2019/0370071 A1* 12/2019 Matveev ............... G06F 9/5016
2019/0370644 A1* 12/2019 Kenney ................ G06N 3/0675

OTHER PUBLICATIONS

Intel—Intel Advanced Vector Extension (AVX2) architecture Ädvanced Vector Extensions, Wikipedia, 7 pgs., retrieved from the internet Jan. 27, 2020 at: https://en.wikipedia.org/wiki/Advanced_Vector_Extensions.

Dettmers, T. "Deep Learning in a Nutshell: Core Concepts", NVIDIA, 10 pgs, retreived from the internet Jan. 27, 2020 at: https://devblogs.nvidia.com/deep-learning-nutshell-core-concepts/ (Nov. 3, 2015).

Das, R. et al. "DNN Accelerator Architecture—SIMD or Systolic?", ACM SIGARCH, Computer Architecture Today, 9 pgs., retrieved from the internet Jan. 27, 2020 at: https://www.sigarch.org/dnn-accelerator-architecture-simd-or-systolic/ (Sep. 17, 2018).

* cited by examiner

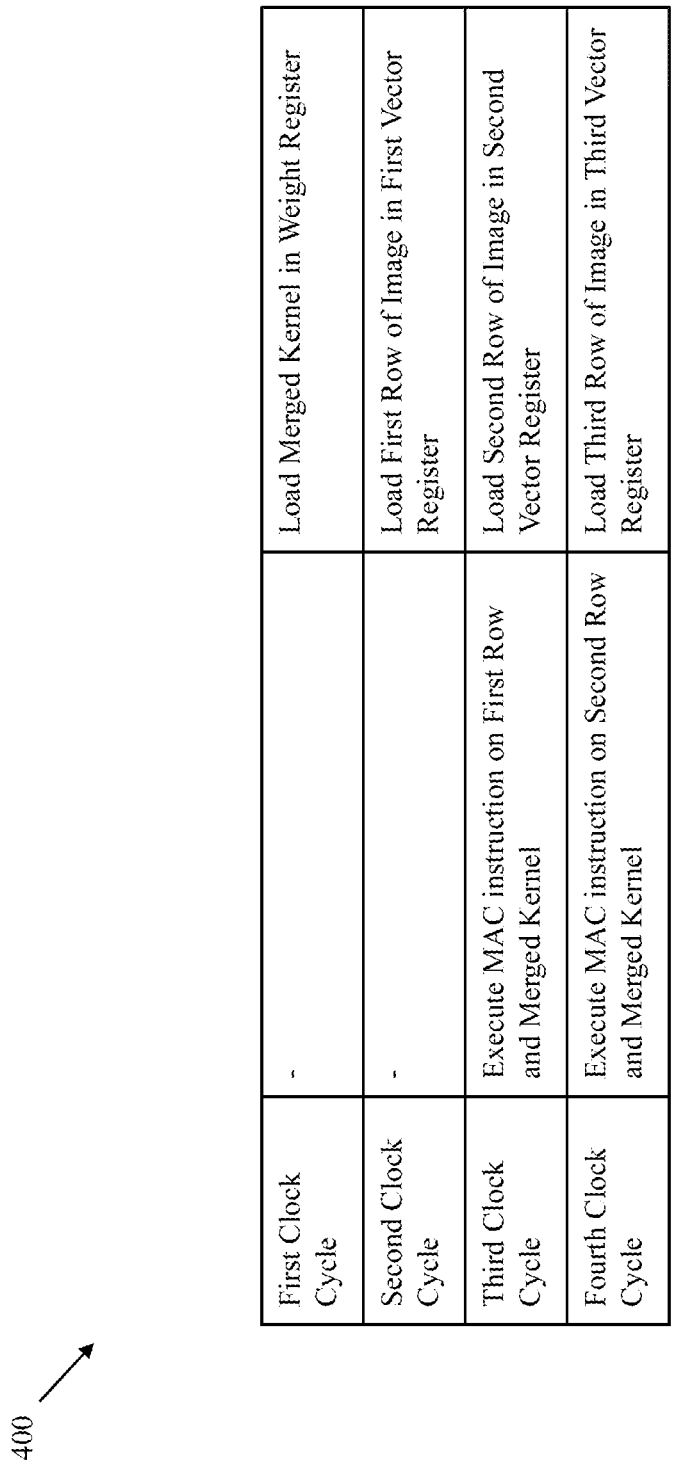

FIG. 4

| First Clock Cycle | - | Load Merged Kernel in Weight Register |
|---|---|---|
| Second Clock Cycle | - | Load First Row of Image in First Vector Register |
| Third Clock Cycle | Execute MAC instruction on First Row and Merged Kernel | Load Second Row of Image in Second Vector Register |
| Fourth Clock Cycle | Execute MAC instruction on Second Row and Merged Kernel | Load Third Row of Image in Third Vector Register |

SYSTEM AND METHOD FOR CONVOLVING AN IMAGE

BACKGROUND

The present invention relates generally to image processing systems, and, more particularly, to a system and a method for convolving an image.

Convolution technique is utilized for performing various image processing functions, such as object detection and classification on an image, based on extracted features of the image. Conventionally, for convolving an image by a convolution system, vector and scalar load operations are executed to load a single row of the image in a vector register and a weight coefficient of the kernel that is associated with the loaded row in a scalar register, respectively. Further, multiplication and accumulation operations are executed to multiply each element of the loaded row with the associated weight coefficient and accumulate an output of the multiplication operation in an accumulation register, respectively. When the multiplication and accumulation operations are being executed on the loaded row, a subsequent row is similarly loaded in a subsequent vector register, i.e., the multiplication and accumulation operations of the loaded row and the vector load operation of the subsequent row are performed in the same clock cycle. Further, the scalar load operation is executed to load a subsequent weight coefficient of the kernel that is associated with the subsequent row in the next clock cycle. Thus, the convolution system is unable to execute the multiplication and accumulation operations and the scalar load operations in each clock cycle. Further, multiple clock cycles are consumed for loading each coefficient of the kernel thereby leading to execution of several scalar load operations. In addition, to execute various image processing functions on the image by way of multiple kernels, each row is loaded several times for convolving the image with each kernel, thereby requiring a large memory bandwidth of the system. Therefore, there exists a need for a system and a method that solves the aforementioned problems of the existing techniques of convolving the image.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 4 is a table illustrating operations performed at each clock cycle by a load-store circuit and a convolution circuit of the system of FIG. 1, in accordance with an embodiment of the present invention;

DETAILED DESCRIPTION

Figure 1:
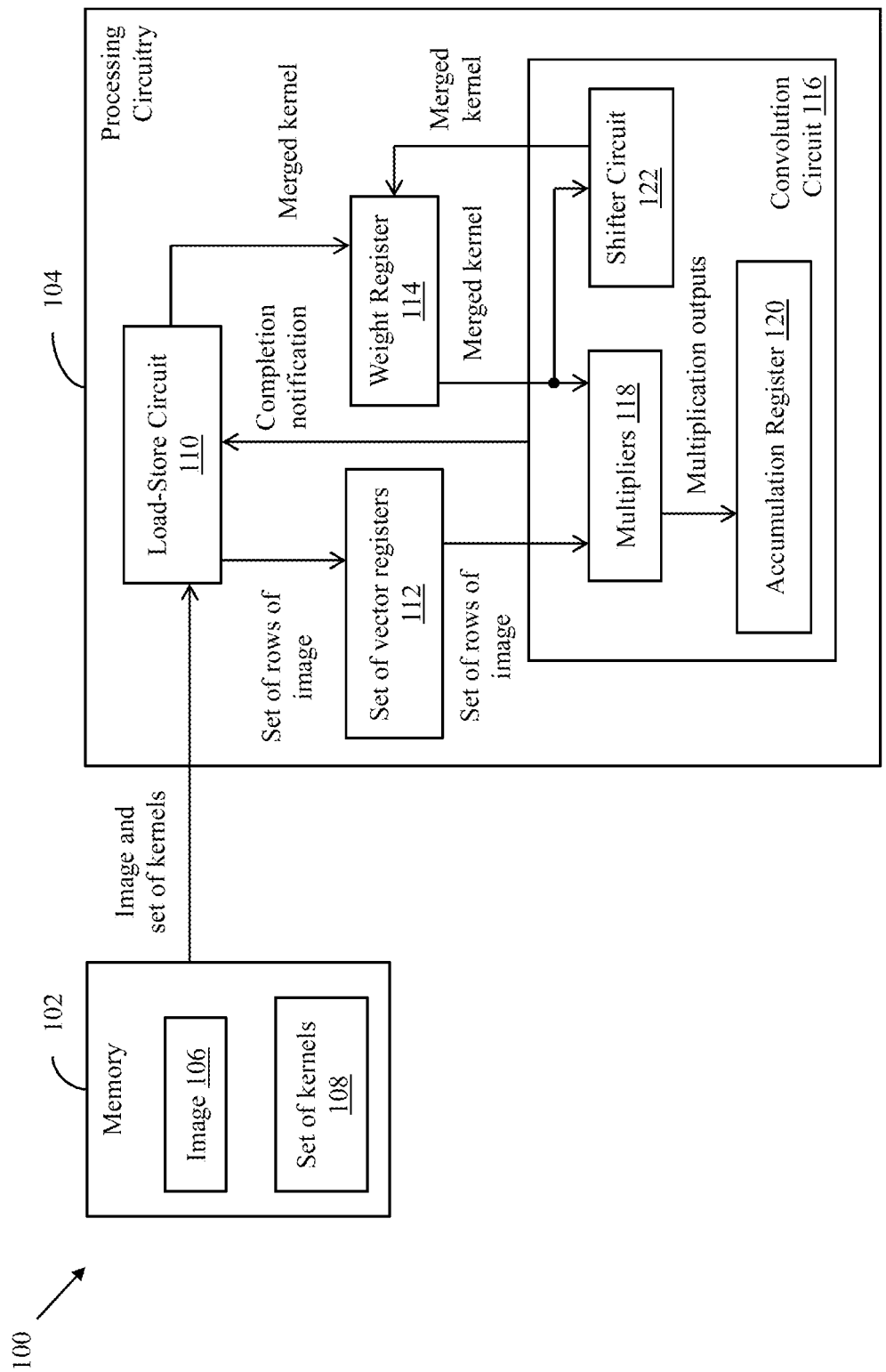
FIG. 1 is a schematic block diagram of a system for convolving a set of images in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a system for convolving an image. The system includes a processing circuitry configured to retrieve the image and a set of kernels, and merge serially, the set of kernels column-wise, to generate a merged kernel. The processing circuitry is further configured to execute for a plurality of times, a multiply-accumulate (MAC) instruction and a load instruction parallelly in one clock cycle on a set of rows of the image and the merged kernel to convolve the image with the merged kernel. The MAC and load instructions are executed parallelly on first and second rows of the set of rows in one clock cycle, respectively, such that the second row is subsequent to the first row. To execute the MAC instruction, the processing circuitry executes multiplication and accumulation operations on the first row and a first coefficient of the merged kernel and a logical shift operation on the merged kernel.

In another embodiment, the present invention provides a method for convolving an image. The method includes retrieving, by a processing circuitry, the image and a set of kernels, and merging serially the set of kernels column-wise, to generate a merged kernel. The method further includes executing for a plurality of times, by the processing circuitry, a MAC instruction and a load instruction parallelly in one clock cycle on a set of rows of the image and the merged kernel to convolve the image with the merged kernel. The MAC and load instructions are executed parallelly in one clock cycle on first and second rows of the set of rows, respectively, such that the second row is subsequent to the first row. Executing the MAC instruction includes executing multiplication and accumulation operations on the first row and a first coefficient of the merged kernel. Executing the MAC instruction further includes executing a logical shift operation on the merged kernel.

Various embodiments of the present invention provide a system and a method for convolving an image. The system includes a processing circuitry that retrieves the image and a set of kernels. The processing circuitry merges all columns of each kernel serially to generate a merged kernel. Further, a MAC instruction and a load instruction are executed parallelly in one clock cycle for multiple times, on a set of rows of the image and the merged kernel. To execute the MAC instruction, the processing circuitry executes multiplication and accumulation operations on a loaded row in a vector register and a corresponding coefficient of the merged kernel and further executes a logical shift operation on the merged kernel. Further, the processing circuitry executes the load instruction parallelly on a subsequent row.

The processing circuitry loads each row of the image once, thereby eliminating a requirement to load each row of the image multiple times for convolving the image with the merged kernel. Thus, the system requires a lower memory bandwidth as compared to conventional systems that load each row multiple times. Further, the logical shift operation on the merged kernel, the multiplication and accumulation operations on the loaded row, and the load instruction on the subsequent row are executed in one clock cycle. Thus, due to the execution of various instructions and operations in the same clock cycle, a utilization and an efficiency of the system to convolve the image is improved as compared to conventional systems that were unable to execute the multiply and accumulate operations and loading of each coefficient of a corresponding kernel in the same clock cycle.

Referring now to FIG. 1, a schematic block diagram of a system 100 for convolving a set of images, in accordance with an embodiment of the present invention is shown. The system 100 may be utilized to implement a convolutional neural network that includes multiple convolution layers for performing various image processing functions. The system 100 includes a memory 102 and a processing circuitry 104.

The set of images includes an image 106 that may be captured by an image sensor (not shown). In one embodiment, the image sensor is internal to the system 100. In another embodiment, the image sensor is external to the system 100. The image sensor outputs the captured image 106 in a specific format and provides the outputted image 106 to a pre-processing circuit (not shown). In one example, the image sensor outputs the image 106 in a bayer pattern image format.

The pre-processing circuit converts the image 106 from the bayer pattern image format to a YUV image format and provides it to the memory 102. The image 106 is a matrix of elements that may have dimensions including, but not limited to, 1080×1080, 1080×720, 1024×768, and 1920×1080. It will be apparent to a person skilled in the art that though in the current embodiment, the image 106 is captured by the image sensor in various other embodiments the image 106 may represent an output of a previous convolution layer of the convolutional neural network.

The memory 102 is configured to store the received image 106 from the pre-processing circuit. The memory 102 further stores a set of kernels 108 that are utilized to extract various features from the image 106 for executing an image processing function such as object detection. Examples of such features are edges, objects, and the like. Each kernel of the set of kernels 108 is a matrix of weight coefficients that indicates a feature to be extracted from the image 106. In one example, a first kernel (shown later in FIG. 2) of the set of kernels 108 indicates edges to be extracted from the image 106 whereas a second kernel (shown later in FIG. 2) of the set of kernels 108 indicates objects to be extracted from the image 106. Further, each kernel has equal number of rows and columns. For the sake of ongoing discussion and without limiting the scope of the invention, it is assumed that dimensions of each kernel are 'H'×'H', for example, 3×3, 5×5, 7×7, and 11×11. Examples of the memory 102 include, but are not limited to, a dynamic random-access memory (DRAM), a static random-access memory (SRAM), and the like.

The processing circuitry 104 is connected to the memory 102 to retrieve the image 106 and the set of kernels 108 from the memory 102. The processing circuitry 104 is a digital signal processor that merges serially, the set of kernels 108 column-wise, i.e., merges all columns of all kernels in a serial manner, to generate a merged kernel (shown later in FIG. 2). Further, the processing circuitry 104 executes a multiply-accumulate (MAC) instruction and a load instruction in one clock cycle, parallelly, for several times on a set of rows (shown later in FIG. 2) of the image 106 and the merged kernel to convolve the image 106 with the merged kernel. In one example, the set of rows corresponds to the entire image 106. In another example, the set of rows corresponds to a portion of the image 106. Examples of the processing circuitry 104 include, but are not limited to, an application-specific integrated circuit processor, a reduced instruction set computing processor, a complex instruction set computing processor, a field-programmable gate array, and the like.

The processing circuitry 104 includes a load-store circuit 110, a set of vector registers 112, a weight register 114, and a convolution circuit 116. The load-store circuit 110 is connected to the memory 102 for retrieving the image 106 and the set of kernels 108. The load-store circuit 110 generates the merged kernel by merging serially the set of kernels 108 column-wise. The load-store circuit 110 is further connected to the set of vector registers 112 and the weight register 114 for executing the load instruction. Executing the load instruction includes loading the merged kernel in the weight register 114 for storing the merged kernel therein, and each row in each vector register in a corresponding clock cycle such that the set of rows are stored in the set of vector registers 112. In one example, a first row (shown later in FIG. 2) of the set of rows is loaded in one clock cycle in a first vector register (shown later in FIG. 3A) of the set of vector registers 112. Further, a second row (shown later in FIG. 2) that is subsequent to the first row is loaded in a subsequent clock cycle in a second vector register (shown later in FIG. 3B) after the first row is loaded in the first vector register.

Each vector register of the set of vector registers 112 is an N-bit register, i.e., a width of each vector register is 'N'. Further, each vector register is configured to store 'N' elements of a corresponding row. A number of elements in each row is based on the width of a corresponding vector register. In one example, the width of each vector register 'N' is 64. Thus, each row has 64 elements. Further, a width of the weight register 114 equals the width of each vector register. Thus, the weight register 114 is an N-bit register, i.e., the width of the weight register 114 is 'N'. The weight register 114 is configured to store at a time, a number of coefficients of the set of kernels 108 that equals the width 'N' of the weight register 114. In the presently preferred embodiment, the number of coefficients of the set of kernels 108 is less than 'N' and the weight register 114 stores all coefficients associated with each column of each kernel serially.

The convolution circuit 116 is connected to the set of vector registers 112 and the weight register 114 for receiving the set of rows and the merged kernel, respectively. The convolution circuit 116 executes the MAC instruction multiple times on the set of rows and the merged kernel for convolving the set of rows and the merged kernel. The MAC instruction includes multiple instructions in a very long instruction word (VLIW) architecture. Executing the MAC instruction includes executing multiplication and accumulation operations on a loaded row and an associated coefficient, and a logical shift operation on the merged kernel. Each instruction in the VLIW architecture corresponds to a single instruction multiple data (SIMD) instruction. Further, the MAC instruction supports byte operations and half-word operations, i.e., the MAC instruction may be executed on one of 8-bit or 16-bit operands.

A number of times the MAC instruction is executed for each kernel is based on a number of rows in the set of rows and a number of coefficients associated with a corresponding column of each kernel, respectively. In the presently preferred embodiment, the convolution circuit 116 executes the MAC instruction 'H' times for convolving 'H' rows with 'H' coefficients that are associated with a first column of each kernel. In one example, the convolution circuit 116 executes the MAC instruction three times for convolving three rows of the set of rows with three coefficients that are associated with the first column of each kernel.

The convolution circuit 116 includes multipliers 118, an accumulation register 120, and a shifter circuit 122. The multipliers 118 are connected to the set of vector registers 112 and the weight register 114 for receiving the set of rows and the merged kernel, respectively. The multipliers 118 are configured to execute the multiplication operation for multiplying each element associated with each row with a corresponding coefficient of the merged kernel to generate several multiplication outputs. The accumulation register 120 is connected to the multipliers 118 for receiving the multiplication outputs, and executes the accumulation operation to accumulate the multiplication outputs therein. In one example, a value of 'H' is three, and the accumulation register 120 stores contents of the accumulation register 120, i.e., a first result of convolution between 'H' rows and coefficients associated with the first column of the first kernel and accumulates the first result in a first buffer register (not shown) of the convolution circuit 116. Similarly, the accumulation register 120 stores second and third results, i.e., convolution of coefficients associated with the first columns of the second kernel and a third kernel (shown later in FIG. 2) of the set of kernels 108 with the 'H' rows in second and third buffer registers (not shown), respectively. For accumulating a fourth result associated with the convolution of the next 'H' rows of the set of rows with coefficients associated with a second column of the first kernel, the accumulation register 120 retrieves the contents of the first buffer register. The accumulation register 120 further accumulates and stores the accumulated fourth and first results in the first buffer register. It will be understood by those of skill in the art that above mentioned process is performed for the remaining coefficients of all columns of each kernel. The multiplication and accumulation operations are thus executed on each row by the convolution circuit 116 for a number of times that is based on the width of each vector register, i.e., 'N', in a corresponding clock cycle.

The shifter circuit 122 is connected to the weight register 114 for receiving the merged kernel. The shifter circuit 122 is configured to execute the logical shift operation on the merged kernel. In the logical shift operation, a current coefficient of the merged kernel, is shifted by replacing the current coefficient with a subsequent coefficient of the merged kernel such that all the coefficients of the merged kernel are rotated circularly by one position at a time. In one example, all the coefficients of the merged kernel are rotated circularly to the right. The current coefficient such as a first coefficient corresponding to the first column of the first kernel, is shifted when a set of elements associated with a currently loaded row, such as the first row, in a corresponding vector register is multiplied with the current coefficient. Further, the subsequent coefficient of the merged kernel is multiplied with a subsequent set of elements of a subsequent row. The shifter circuit 122 provides the merged kernel back to the weight register 114 after executing the logical shift operation every single time. When all the rows of the set of rows are thus convolved with the merged kernel, i.e., when the image 106 is convolved with the merged kernel completely to generate a set of feature map outputs, the convolution circuit 116 generates the completion notification and provides it to the load-store circuit 110. Each feature map output includes an extracted feature of the image 106 that is based on a corresponding kernel. In one example, if the first kernel of the set of kernels 108 is an edge detection kernel, a first feature map output includes edges extracted from the image 106. On receiving the completion notification, the load-store circuit 110 retrieves a subsequent image (not shown) of the set of images from the memory 102 and associated set of kernels (not shown) with the subsequent image to convolve the subsequent image.

Figure 2:
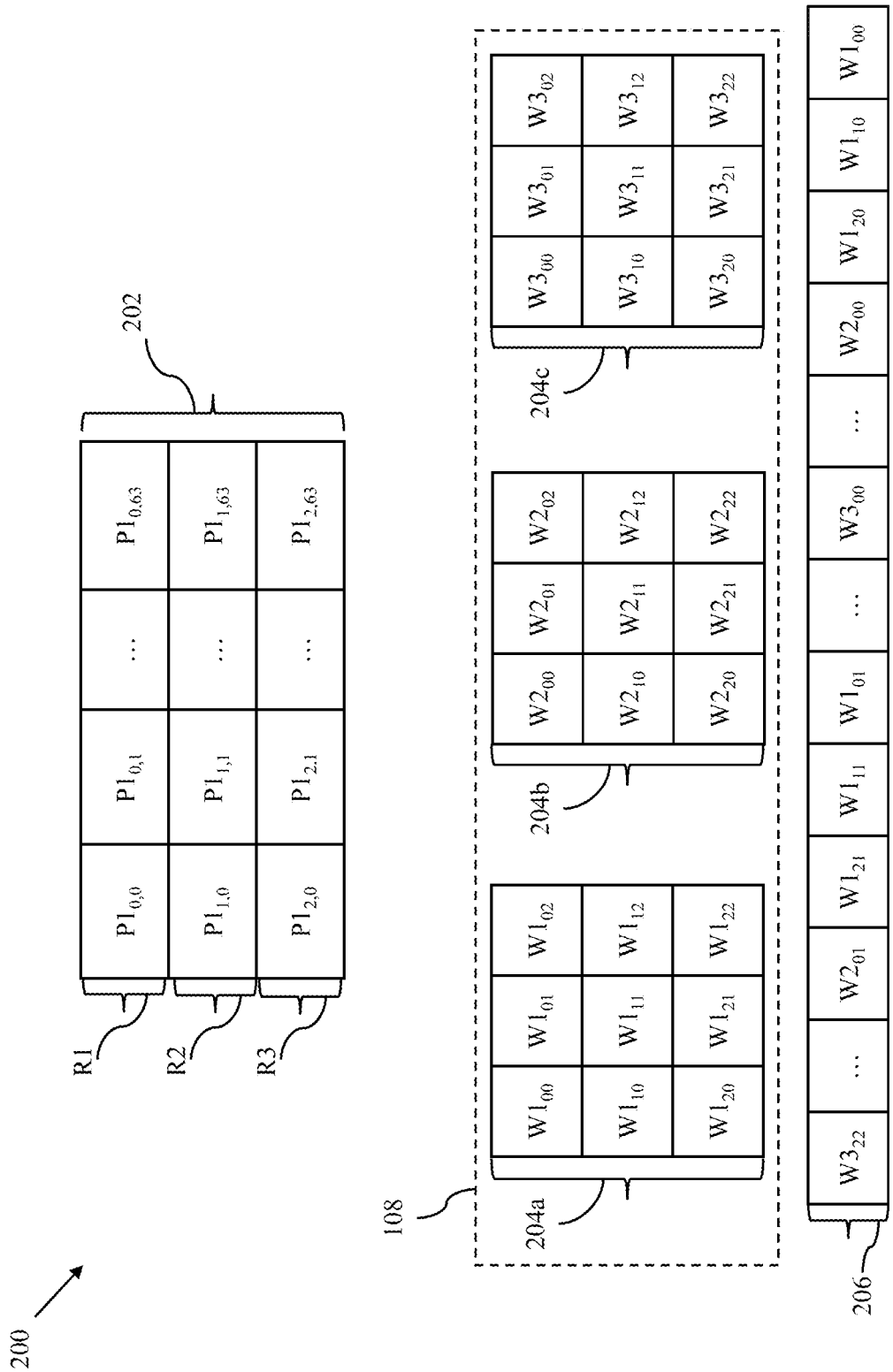
FIG. 2 is a matrix representation of a set of rows of an image and a set of kernels that are to be convolved by the system of FIG. 1 in accordance with an embodiment of the present invention.

Referring now to FIG. 2, a matrix representation 200 of the set of rows and the set of kernels 108 that are to be convolved by the system 100, in accordance with an embodiment of the present invention is shown.

The set of rows (hereinafter referred to as "the set of rows 202") includes multiple rows of which first through third rows R1-R3 are shown. In one example, the first row R1 has elements $P1_{0,0}$, $P1_{0,1}$, ..., $P1_{0,63}$ of the image 106, the second row R2 has elements $P1_{1,0}$, $P1_{1,1}$, ..., $P1_{1,63}$ of the image 106, and the third row R3 has elements $P1_{2,0}$, $P1_{2,1}$, $P1_{2,63}$ of the image 106.

The set of kernels 108 include the first through third kernels (hereinafter referred to as "the first through third kernels 204a-204c"). The first column of the first kernel 204a includes coefficients $W1_{00}$, $W1_{10}$, and $W1_{20}$, the second column of the first kernel 204a includes coefficients $W1_{01}$, $W1_{11}$, and $W1_{21}$, and a third column of the first kernel 204a includes coefficients $W1_{02}$, $W1_{12}$, and $W1_{22}$. Further, first, second, and third columns of the second kernel 204b include coefficients $W2_{00}$, $W2_{10}$, and $W2_{20}$; $W2_{01}$, $W2_{11}$, and $W2_{21}$; and $W2_{02}$, $W2_{12}$, and $W2_{22}$, respectively, and first, second, and third columns of the third kernel 204c include coefficients $W3_{00}$, $W3_{10}$, and $W3_{20}$; $W3_{01}$, $W3_{11}$, and $W3_{21}$; and $W3_{02}$, $W3_{12}$, and $W3_{22}$, respectively. It will be apparent to those of skill in the art that the scope of the invention is not limited to the first through third kernels 204a-204c but may include any number of kernels for extracting corresponding features from the image 106.

The merged kernel 206 is generated by merging serially the first through third kernels 204a-204c column-wise such that a number of columns of each of the first through third kernels 204a-204c are merged one after the other in a serial manner. The merged kernel 206 thus includes the coefficients $W1_{00}$, $W1_{10}$, $W1_{20}$, $W2_{00}$, ..., $W3_{00}$, ..., $W1_{01}$, $W1_{11}$, $W1_{21}$, $W2_{01}$, ..., $W3_{22}$. In one embodiment, the merged kernel 206 is generated such that the first coefficient $W1_{00}$ of the first kernel 204a is a Least Significant Bit (LSB) of the merged kernel 206. In another embodiment, the merged kernel 206 is generated such that the first coefficient $W1_{00}$ of the first kernel 204a is a Most Significant Bit (MSB) of the merged kernel 206. For the sake of ongoing discussion, it is assumed that the merged kernel 206 is generated such that the first coefficient $W1_{00}$ of the first kernel 204a is the LSB of the merged kernel 206.

Figure 3A:
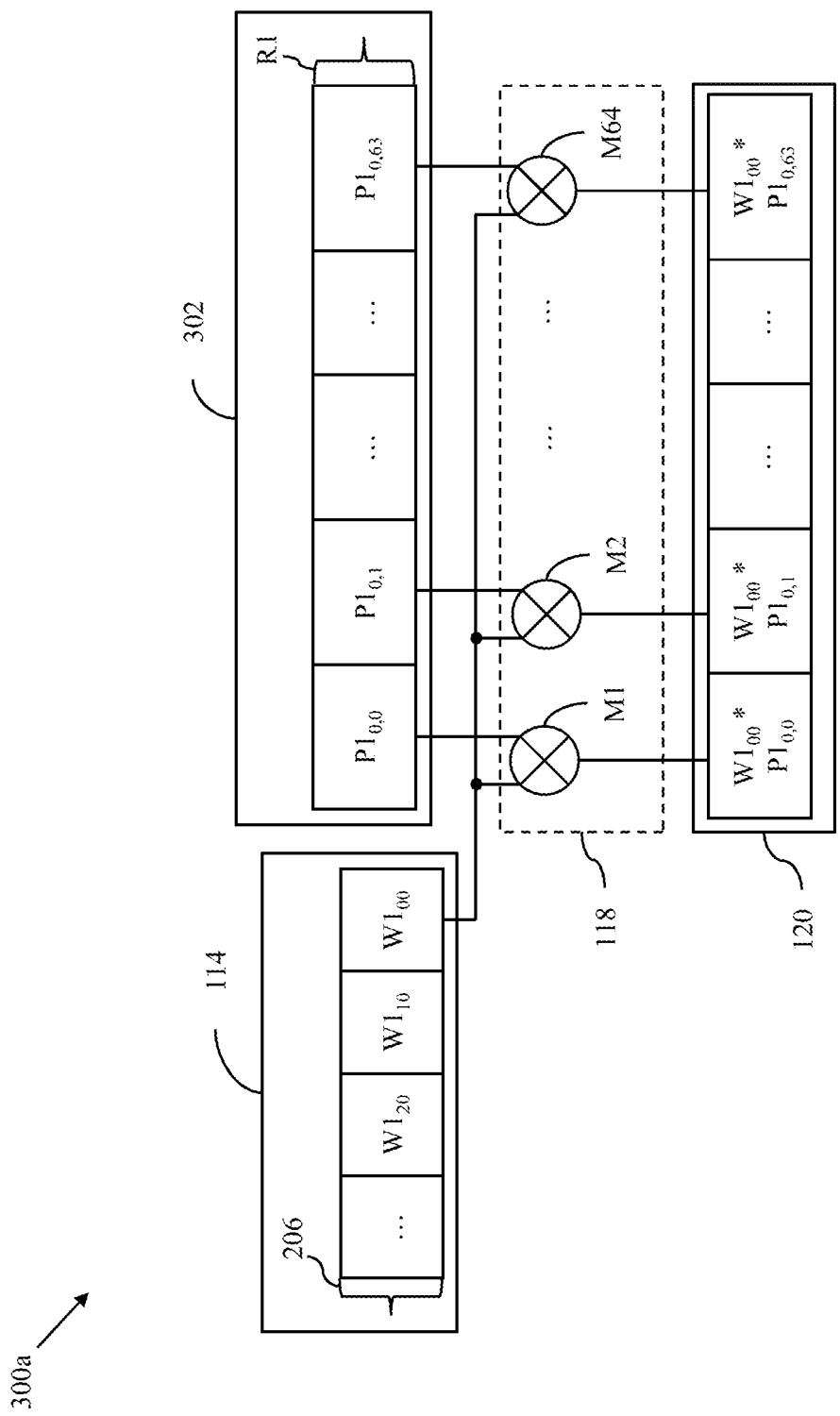
FIGS. 3A-3C are block diagrams that, collectively, illustrate convolution of first through third rows of the set of rows of FIG. 2 with the merged kernel of FIG. 2 in accordance with an embodiment of the present invention.
Figure 3B:
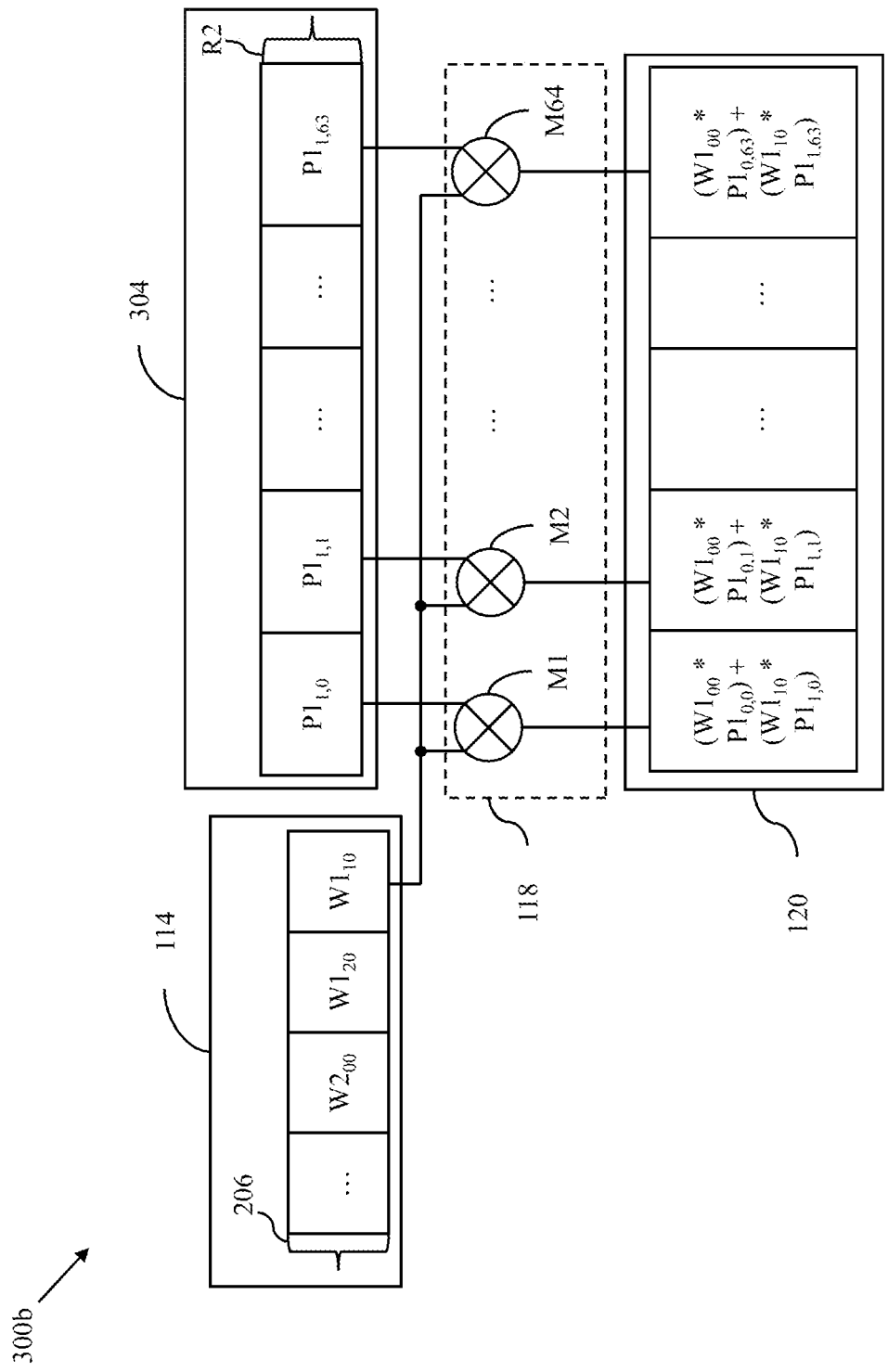
Figure 3C:
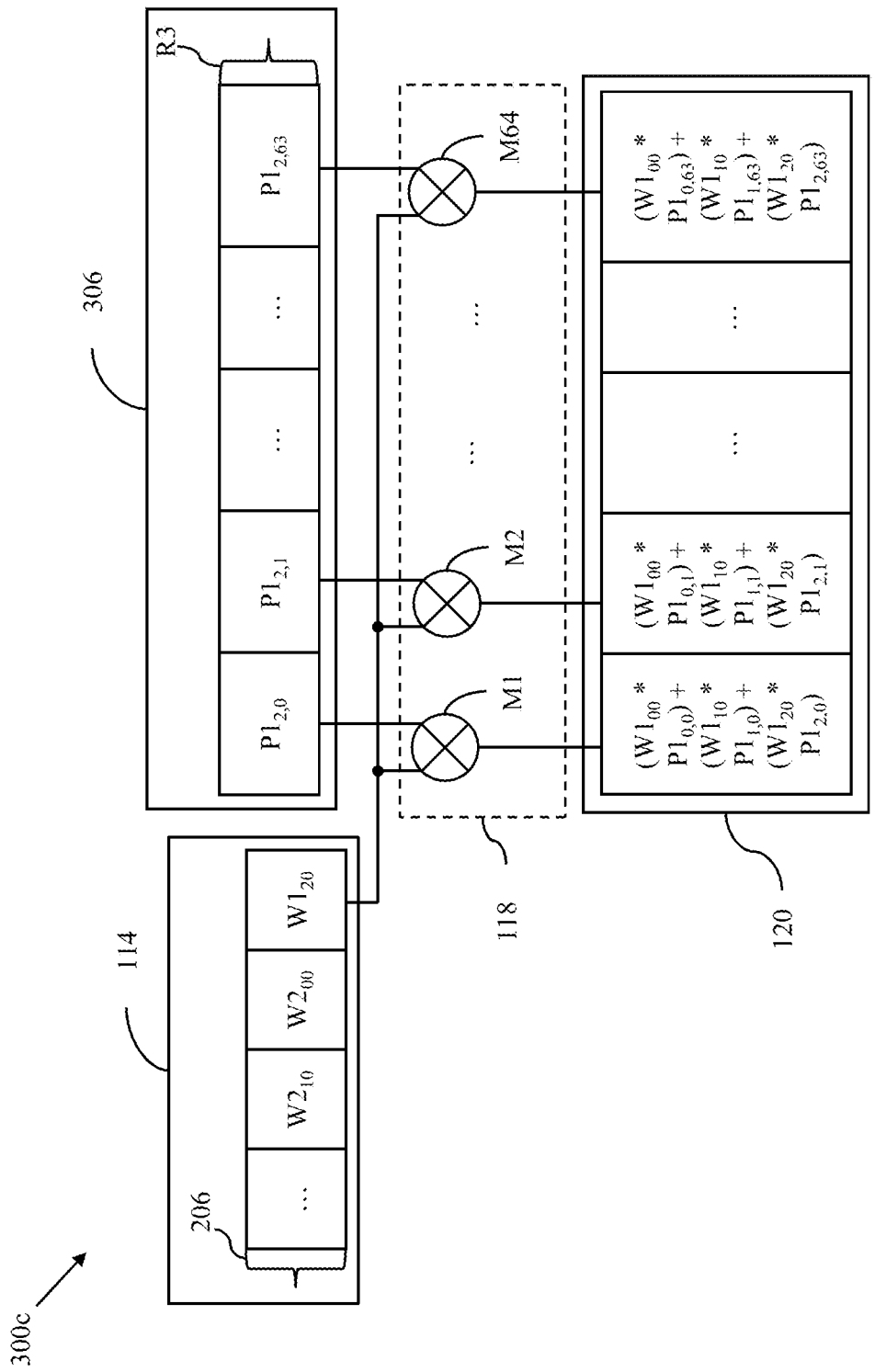

Referring now to FIGS. 3A-3C, block diagrams 300a-300c illustrating convolution of the first through third rows R1-R3 with the merged kernel 206, in accordance with an embodiment of the present invention are shown. For the sake of simplicity of the ongoing discussion, the convolution of the first through third rows R1-R3 is explained with the first through third coefficients $W1_{00}$, $W1_{10}$, and $W1_{20}$ of the merged kernel 206.

Referring now to FIG. 3A, the block diagram 300a illustrates the execution of the MAC instruction on the first row R1 and the merged kernel 206. The merged kernel 206 is loaded by the load-store circuit 110 in the weight register 114. The first row R1 is loaded by the load-store circuit 110 in the first vector register 302. A first multiplier M1 receives a first element $P1_{0,0}$ of the first row R1 as a first input, and an LSB of the merged kernel 206, i.e., $W1_{00}$ as a second input. The first multiplier M1 multiplies the first element $P1_{0,0}$ and the LSB of the merged kernel 206 to generate a first multiplication output $W1_{00}*P1_{0,0}$. Similarly, second through sixty-fourth multipliers M2, ..., M64 multiply the second through sixty-fourth elements $P1_{0,1}, \ldots, P1_{0,63}$ of the first row R1 and the LSB of the merged kernel 206 to generate second through sixty-fourth multiplication outputs $W1_{00}*P1_{0,1}, \ldots, W1_{00}*P1_{0,63}$, respectively. The accumulation register 120 receives the first through sixty-fourth multiplication outputs $W1_{00}*P1_{0,0}, W1_{00}*P1_{0,1}, \ldots, W1_{00}*P1_{0,63}$ and executes the accumulation operation to accumulate the first through sixty-fourth multiplication outputs $W1_{00}*P1_{0,0}, W1_{00}*P1_{0,1}, \ldots, W1_{00}*P1_{0,63}$. The shifter circuit 122 executes the logical shift operation on the merged kernel 206 when the first through sixty-fourth multiplication outputs $W1_{00}*P1_{0,0}, W1_{00}*P1_{0,1}, \ldots, W1_{00}*P1_{0,63}$ are accumulated in the accumulation register 120. The logical shift operation shifts the first coefficient $W1_{00}$ either left or right by a single bit such that the first coefficient $W1_{00}$ is replaced with a second coefficient $W1_{10}$ of the merged kernel 206 thereby leading to the second coefficient $W1_{10}$ becoming the LSB of the merged kernel 206.

Referring now to FIG. 3B, the block diagram 300b illustrates the execution of the MAC instruction on the second row R2 and the merged kernel 206. The second row R2 is loaded by the load-store circuit 110 in the second vector register 304. Similar to the MAC instruction being performed on the first row R1, each of the first through sixty-fourth multipliers M1, M2, ..., M64 receives and multiplies a corresponding element, i.e., $P1_{1,0}, P1_{1,1}, \ldots, P1_{1,63}$, of the second row R2 (received as a first input) and the LSB of the merged kernel 206, i.e., $W1_{10}$ (received as a second input), to generate sixty-fifth through one-hundred and twenty-eighth multiplication outputs $W1_{10}*P1_{1,0}, W1_{10}*P1_{1,1}, \ldots, W1_{10}*P1_{1,63}$, respectively. The accumulation register 120 receives the sixty-fifth through one-hundred and twenty-eighth multiplication outputs $W1_{10}*P1_{1,0}, W1_{10}*P1_{1,1}, \ldots, W1_{10}*P1_{1,63}$ and executes the accumulation operation to accumulate the sixty-fifth through one-hundred and twenty-eighth multiplication outputs $W1_{10}*P1_{1,0}, W1_{10}*P1_{1,1}, \ldots, W1_{10}*P1_{1,63}$ along with the first through sixty-fourth multiplication outputs $W1_{00}*P1_{0,0}, W1_{00}*P1_{0,1}, \ldots, W1_{00}*P1_{0,63}$, i.e., $W1_{00}*P1_{0,0}+W1_{10}*P1_{1,0}, W1_{00}*P1_{0,1}+W1_{10}*P1_{1,1}, \ldots, W1_{00}*P1_{0,63}+W1_{10}*P1_{1,63}$. The shifter circuit 122 executes the logical shift operation on the merged kernel 206 to replace the second coefficient $W1_{10}$ with a third coefficient $W1_{20}$ of the merged kernel 206.

Referring now to FIG. 3C, the block diagram 300c illustrates the execution of the MAC instruction on the third row R3 and the merged kernel 206. The third row R3 is loaded by the load-store circuit 110 in a third vector register 306 of the set of vector registers 112. Similar to the MAC instruction being performed on the second row R2, each of the first through sixty-fourth multipliers M1, M2, ..., M64 receives and multiplies a corresponding element, i.e., $P1_{2,0}, P1_{2,1}, \ldots, P1_{2,63}$, of the third row R3 (received as a first input) and the LSB of the merged kernel 206, i.e., $W1_{20}$ (received as a second input), to generate one-hundred and twenty-ninth through one-hundred and ninety-second multiplication outputs $W1_{20}*P1_{2,0}, W1_{20}*P1_{2,1}, \ldots, W1_{20}*P1_{2,63}$, respectively. The accumulation register 120 receives the one-hundred and twenty-ninth through one-hundred and ninety-second multiplication outputs $W1_{20}*P1_{2,0}, W1_{20}*P1_{2,1}, \ldots, W1_{20}*P1_{2,63}$ and executes the accumulation operation to accumulate the one-hundred and twenty-ninth through one-hundred and ninety-second multiplication outputs $W1_{20}*P1_{2,0}, W1_{20}*P1_{2,1}, \ldots, W1_{20}*P1_{2,63}$ along with the first through sixty-fourth multiplication outputs $W1_{00}*P1_{0,0}, W1_{00}*P1_{0,1}, \ldots, W1_{00}*P1_{0,63}$ and the sixty-fifth through one-hundred and twenty-eighth multiplication outputs $W1_{10}*P1_{1,0}, W1_{10}*P1_{1,1}, \ldots, W1_{10}*P1_{1,63}$, i.e., $W1_{00}*P1_{0,0}+W1_{10}*P1_{1,0}+W1_{20}*P1_{2,0}, W1_{00}*P1_{0,1}+W1_{10}*P1_{1,1}+W1_{20}*P1_{2,1}, \ldots, W1_{00}*P1_{0,63}+W1_{10}*P1_{1,63}+W1_{20}*P1_{2,63}$.

After the convolution of the first through third rows R1-R3 with the first through third coefficients $W1_{00}, W1_{10}$, and $W1_{20}$ that are associated with the first column of first kernel 204a, a result of the convolution, i.e., the first result is accumulated in the first buffer register. Similarly, the accumulation register 120 stores the second and third results, i.e., convolution of coefficients associated with the first columns of the second and third kernels 204b and 204c, i.e., $W2_{00}, W2_{10}$, and $W2_{20}$ and $W3_{00}, W3_{10}$, and $W3_{20}$, with the first through third rows R1-R3 rows in the second and third buffer registers (not shown), respectively. For accumulating the fourth result associated with the convolution of next 'H' rows such as fourth through sixth rows (not shown) of the set of rows 202 with the coefficients associated with the second column of the first kernel 204a, i.e. $W1_{01}, W1_{11}$, and $W1_{21}$, the accumulation register 120 retrieves the contents of the first buffer register, i.e., the first result. The accumulation register 120 further accumulates and stores the accumulated fourth and first results in the first buffer register. It will be understood by those of skill in the art that above process of executing the MAC instruction and the load instruction is performed for the remaining coefficients of the merged kernel 206 to convolve the merged kernel 206 with the corresponding rows of the image 106.

Referring now to FIG. 4, a table 400 illustrating operations performed at each clock cycle by the load-store circuit 110 and the convolution circuit 116, in accordance with an embodiment of the present invention is shown. For the sake of simplicity of the ongoing discussion and without deviating from the scope of the invention, the operations performed in four clock cycles are explained.

In a first clock cycle, the load-store circuit 110 loads the merged kernel 206 in the weight register 114. In a subsequent clock cycle, i.e., a second clock cycle, the load-store circuit 110 loads the first row R1 in the first vector register 302.

In a third clock cycle, the convolution circuit 116 executes the MAC instruction on the first row R1 and the merged kernel 206 as described in FIG. 3A, and the load-store circuit 110 loads the second row R2 in the second vector register 304.

In a fourth clock cycle, the convolution circuit 116 executes the MAC instruction on the second row R2 and the merged kernel 206 as described in FIG. 3B, and the load-store circuit 110 loads the third row R3 in the third vector register 306.

The MAC and load instructions are thus executed simultaneously on different rows in each clock cycle starting from the third clock cycle until the image 106 is convolved completely with the merged kernel 206. Hence, the convolution circuit 116 executes the MAC instruction on the currently loaded row (example, the first row R1) and the merged kernel 206, and the load-store circuit 110 loads a subsequent row (example, the second row R2) in a subsequent vector register (example, the second vector register 304) in the same clock cycle.

Figure 5A:
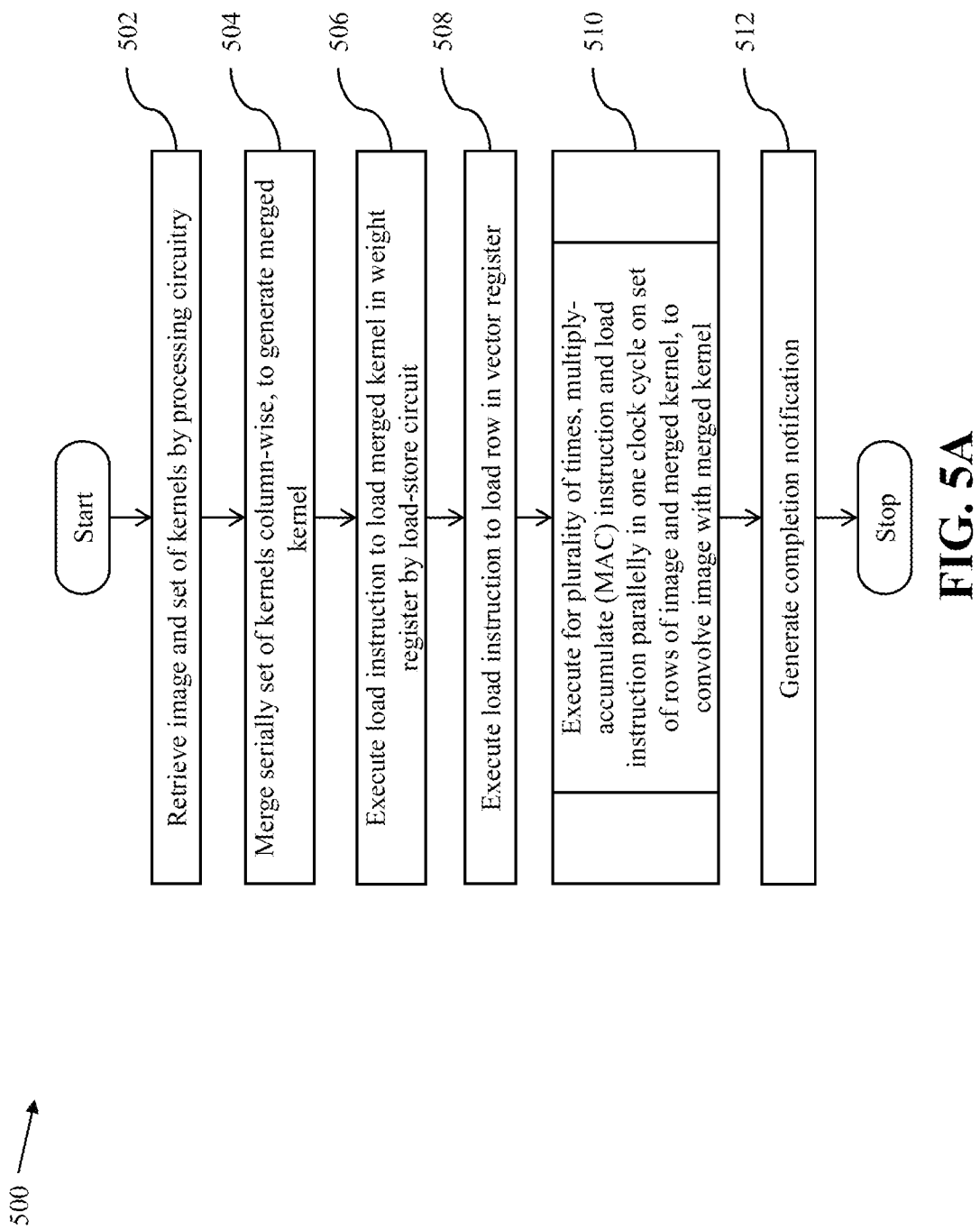
FIGS. 5A-5C, collectively, represent a flow chart that illustrates a method for convolving the image by a processing circuitry of the system of FIG. 1, in accordance with an embodiment of the present invention.
Figure 5B:
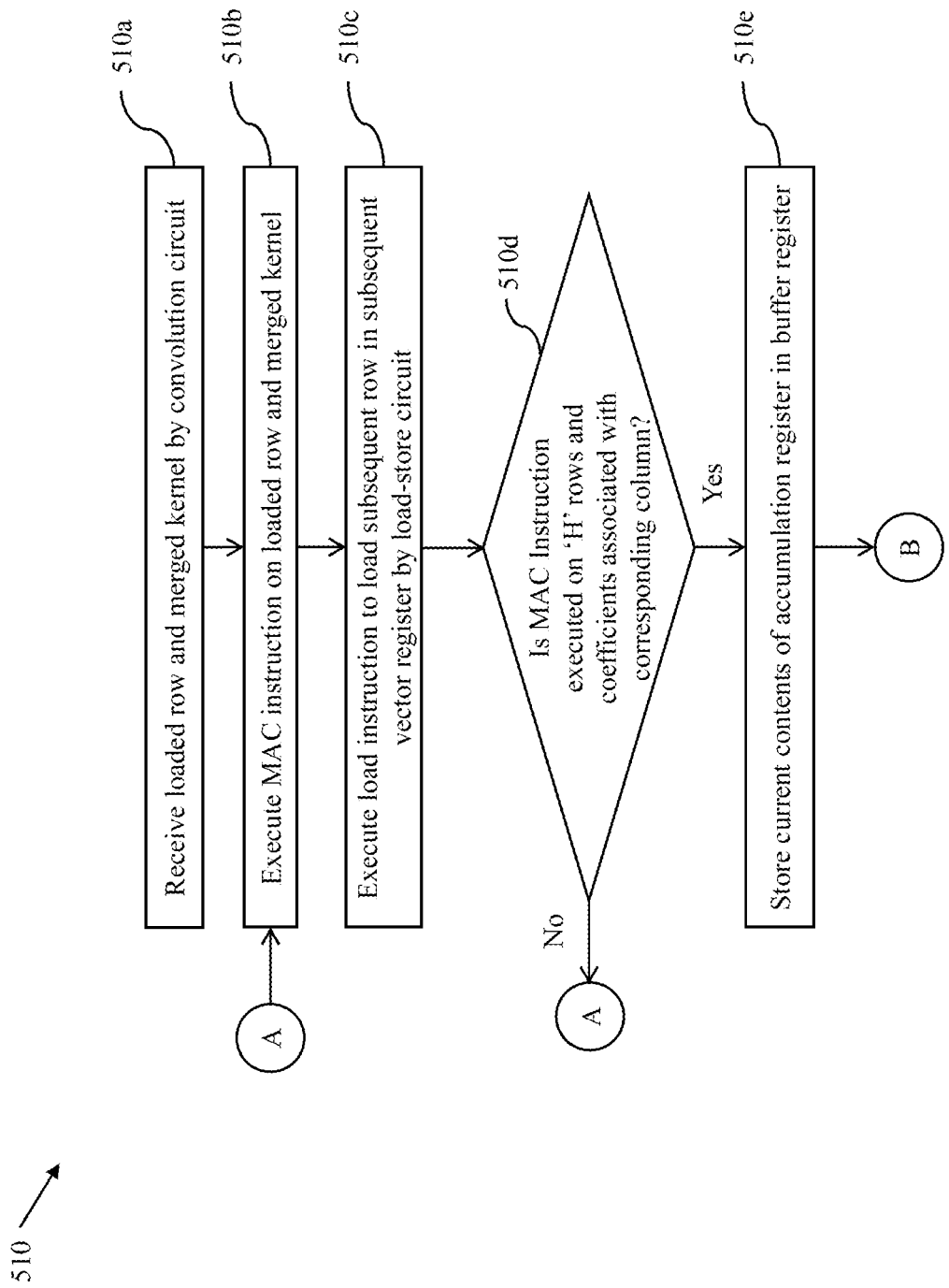
Figure 5C:
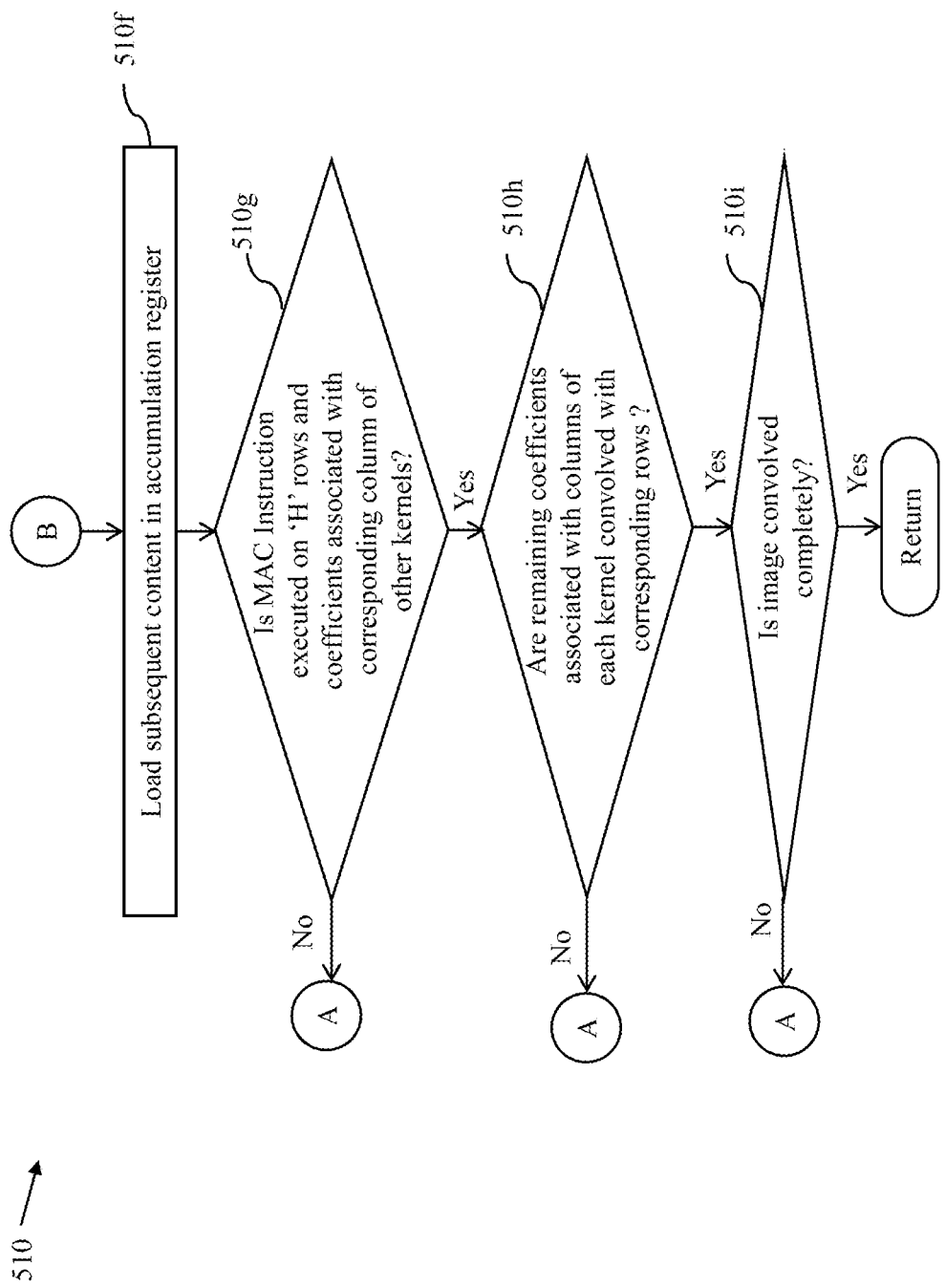

Referring now to FIGS. 5A-5C, a flow chart 500 illustrating a method for convolving the image 106 by the processing circuitry 104, in accordance with an embodiment of the present invention is shown.

Referring now to FIG. 5A, at step 502, the processing circuitry 104 retrieves the image 106 and the set of kernels 108 from the memory 102. At step 504, the processing circuitry 104 merges serially the set of kernels 108 column-wise, to generate the merged kernel 206. At step 506, the load-store circuit 110 executes the load instruction to load the merged kernel 206 in the weight register 114 for storing the merged kernel 206 therein. At step 508, the load-store circuit 110 executes the load instruction to load the first row R1 in a corresponding clock cycle in the first vector register 302 for storing the first row R1 therein. At step 510, the processing circuitry 104 executes for multiple times, the MAC instruction and the load instruction parallelly in one clock cycle on the set of rows 202 and the merged kernel 206, to convolve the image 106 with the merged kernel 206.

Referring now to FIG. 5B, at step 510a, the convolution circuit 116 receives the loaded row (such as, the first row R1) and the merged kernel 206 from the corresponding vector register (such as, the first vector register 302) and the weight register 114, respectively. At step 510b, the convolution circuit 116 executes the MAC instruction on the loaded row and the merged kernel 206. At step 510c, the load-store circuit 110 executes the load instruction to load a subsequent row (such as, the second row R2) in a subsequent vector register (such as, the second vector register 304).

At step 510d, the processing circuitry 104 determines whether the MAC instruction is executed on a number of rows, i.e., 'H' rows, of the set of rows 202 and coefficients associated with a corresponding column of one kernel, such as the coefficients of the first column, i.e., $W1_{00}$, $W1_{10}$, and $W1_{20}$, of the first kernel 204a of the merged kernel 206. If at step Mod, the processing circuitry 104 determines that the MAC instruction is not executed on 'H' rows and the coefficients associated with the corresponding column, the steps 510b and 510c are repeated until the MAC instruction is executed on the 'H' rows and the corresponding coefficients. If at step 510d, the processing circuitry 104 determines that the MAC instruction is executed on the 'H' rows and the coefficients associated with the corresponding column of one kernel, step 510e is executed. At step 510e, the load-store circuit 110 stores the current contents (such as, the first result) of the accumulation register 120 in the corresponding buffer register (such as, the first buffer register).

Referring now to FIG. 5C, at step 510f, the load-store circuit 110 loads from a subsequent buffer register (such as, the second buffer register), current contents of the second buffer register in the accumulation register 120. At step 510g, the processing circuitry 104 determines whether the MAC instruction is executed on all loaded rows of the current 'H' rows and coefficients ($W2_{00}$, $W2_{10}$, and $W2_{20}$, and $W3_{00}$, $W3_{10}$, and $W3_{20}$) of the merged kernel 206 associated with a corresponding column (i.e., first column) of other kernels (second and third kernels 204b and 204c). If at step 510g, the processing circuitry 104 determines that the MAC instruction is not executed on 'H' rows and the coefficients associated with the corresponding column of other kernels, the steps 510b-510f are repeated until the MAC instruction is executed on the 'H' rows and the coefficients associated with the corresponding columns of other kernels. If at step 510g, the processing circuitry 104 determines that the MAC instruction is executed on the 'H' rows and the coefficients associated with the corresponding columns of other kernels, step 510h is executed.

At step 510h, the processing circuitry 104 determines whether all remaining coefficients ($W1_{01}$-$W1_{22}$, $W2_{01}$-$W1_{22}$, and $W3_{01}$-$W3_{22}$) of the merged kernel 206 associated with the columns (i.e., the second and third columns) of each kernel (i.e., first through third kernels 204a-204c) are convolved with corresponding rows of the set of rows 202. If at step 510h, the processing circuitry 104 determines that all remaining coefficients of each kernel are not convolved, the steps 510b-510h are repeated for the remaining coefficients of each kernel. If at step 510h, the processing circuitry 104 determines that all remaining coefficients of each kernel are convolved with the corresponding rows, step 510i is executed.

At step 510i, the processing circuitry 104 determines whether the image 106 is convolved completely, i.e., each remaining row (other than the 'H' rows convolved earlier) of the set of rows 202 is convolved with all the corresponding coefficients of each kernel in the merged kernel 206. If at step 510i, the processing circuitry 104 determines that the image 106 is not convolved completely, the steps 510b-510i are repeated. If at step 510i, the processing circuitry 104 determines that the image 106 is convolved completely, the step 512 is executed.

Referring back to FIG. 5A, at step 512, the processing circuitry 104 generates the completion notification when the image 106 is convolved with the merged kernel 206 completely. It will be apparent to those of skill in the art that the processing circuitry 104 may convolve multiple images with a corresponding merged kernel in a similar manner as described above.

Figure 6:
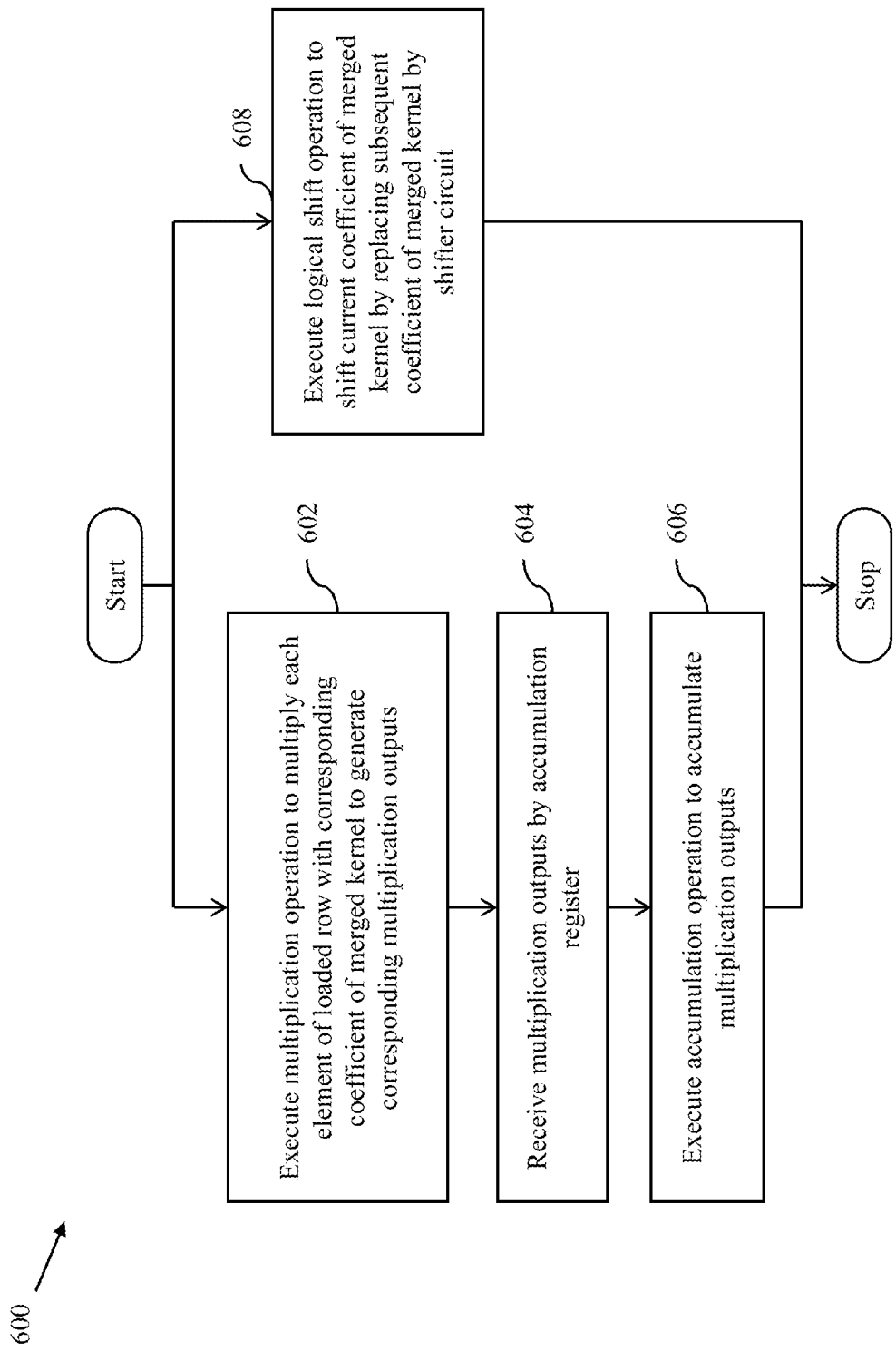
FIG. 6 is a flow chart that illustrates a method for executing a multiply-accumulate (MAC) instruction by the convolution circuit of the system of FIG. 1 on a currently loaded row and its corresponding coefficient, in accordance with an embodiment of the present invention.

Referring now to FIG. 6, a flow chart 600 illustrating a method for executing a MAC instruction by the convolution circuit 116 on a currently loaded row and its corresponding coefficient, in accordance with an embodiment of the present invention is shown.

At step 602, the multipliers 118 execute the multiplication operation to multiply each element of the loaded row with a corresponding coefficient of the merged kernel 206 to generate the corresponding multiplication outputs. At step 604, the accumulation register 120 receives the multiplication outputs from the multipliers 118. At step 606, the accumulation register 120 executes the accumulation operation to accumulate the multiplication outputs therein.

At step 608, the shifter circuit 122 executes the logical shift operation on the merged kernel 206 to shift a current coefficient of the merged kernel 206 by replacing the current coefficient with a subsequent coefficient of the merged kernel 206 such that all coefficients of the merged kernel 206 are rotated circularly by one position. The steps 602-606 and step 608 are executed parallelly in one clock cycle by the convolution circuit 116. It will be understood by those of skill in the art that the convolution circuit 116 executes the MAC instruction on each row of the set of rows 202 in a similar manner as described above.

The system 100 eliminates the need for loading the set of rows 202 multiple times to execute various image processing functions as each row of the set of rows 202 is loaded once in a corresponding vector register of the set of vector registers 112 and the merged kernel 206 is loaded at once in the weight register 114. Further, for a different kernel, the same set of loaded rows are utilized for executing the image processing functions. Hence, a memory bandwidth requirement of the system 100 is less as compared to conventional systems that require loading of the same row multiple times for convolving the same rows with various kernels. The MAC instruction, i.e., the multiplication and accumulation operations executed on the current row and the logical shift operation for shifting coefficients of the merged kernel 206, along with the load instruction, i.e., the load operation executed on the subsequent row, are performed in the same clock cycle. In addition, the need for executing the scalar load operation as implemented by conventional systems to load each coefficient is eliminated as the logical shift operation shifts the coefficients of the merged kernel 206 by shifting one coefficient at a time. Thus, all the four operations (multiplication and accumulation, logical shift, and load operations) are performed at each clock cycle as compared to the conventional systems that are unable to execute the multiplication and accumulation operations at each clock cycle due to interruption by the scalar load operation. As all the four operations are performed in each clock cycle, a number of clock cycles consumed by the system 100 reduces, and a utilization of the system 100 is improved as compared to conventional systems that were unable to utilize the same clock cycle to parallelly perform the scalar load operation along with the multiplication and accumulation operations.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for convolving an image, the system comprising:
 a processing circuitry configured to:
  retrieve the image and a set of kernels;
  merge serially, the set of kernels column-wise, to generate a merged kernel; and
  execute for a plurality of times, a multiply-accumulate (MAC) instruction and a load instruction parallelly in one clock cycle on a set of rows of the image and the merged kernel to convolve the image with the merged kernel, wherein the MAC and load instructions are executed parallelly in one clock cycle on first and second rows of the set of rows, respectively, such that the second row is subsequent to the first row, and wherein:
   to execute the MAC instruction, the processing circuitry executes (i) multiplication and accumulation operations on the first row and a first coefficient of the merged kernel, and (ii) a logical shift operation on the merged kernel.

2. The system of claim 1, further comprising:
 a memory that is configured to store the image and the set of kernels, wherein the processing circuitry is connected to the memory to retrieve the image and the set of kernels.

3. The system of claim 1, wherein the processing circuitry comprises:
 a set of vector registers that is configured to store the set of rows, wherein a first vector register of the set of vector registers is configured to store the first row; and
 a weight register that is configured to store the merged kernel.

4. The system of claim 3, wherein the processing circuitry further comprises:
 a load-store circuit that is connected to the set of vector registers and the weight register, and is configured to execute the load instruction to:
  load the merged kernel in the weight register for storing the merged kernel therein; and
  load each row in each vector register in a corresponding clock cycle for storing the set of rows in the set of vector registers, wherein after the first row is loaded in the first vector register in one clock cycle, the second row is loaded in a second vector register of the set of vector registers in a subsequent clock cycle.

5. The system of claim 4, wherein the processing circuitry further comprises:
 a convolution circuit that is connected to the set of vector registers and the weight register, and is configured to:
  receive the set of rows and the merged kernel from the set of vector registers and the weight register, respectively, for executing the MAC instruction thereon.

6. The system of claim 5, wherein the convolution circuit comprises:
 a plurality of multipliers that are connected to the set of vector registers and the weight register, and are configured to execute the multiplication operation for multiplying each element associated with each row with a corresponding coefficient of the merged kernel to generate pluralities of multiplication outputs; and
 an accumulation register that is connected to the plurality of multipliers, and is configured to receive the pluralities of multiplication outputs and execute the accumulation operation to accumulate the pluralities of multiplication outputs therein.

7. The system of claim 6, wherein the convolution circuit further comprises:
 a shifter circuit that is connected to the weight register, and is configured to execute the logical shift operation on the merged kernel to shift a current coefficient of the merged kernel by replacing the current coefficient with a subsequent coefficient of the merged kernel, when a first plurality of elements associated with the currently loaded row in the vector register are multiplied with the current coefficient.

8. The system of claim 6, wherein when a width of the first vector register is 'N', the convolution circuit executes the multiplication and accumulation operations 'N' times in one clock cycle.

9. The system of claim 5, wherein the convolution circuit executes the MAC instruction 'H' times for convolving 'H' rows of the set of rows with 'H' coefficients of the merged kernel, and wherein the 'H' coefficients are associated with a first column of a first kernel of the set of kernels.

10. The system of claim 1, wherein the MAC instruction includes a plurality of instructions in a very long instruction word (VLIW) architecture, and wherein each instruction of the plurality of instructions corresponds to a single instruction multiple data (SIMD) instruction.

11. The system of claim 1, wherein the processing circuitry is further configured to generate a completion notification when the image is convolved with the merged kernel completely.

12. A method for convolving an image, the method comprising:
 retrieving, by a processing circuitry, the image and a set of kernels;
 merging serially, by the processing circuitry, the set of kernels column-wise, to generate a merged kernel; and
 executing for a plurality of times, by the processing circuitry, a multiply-accumulate (MAC) instruction and a load instruction parallelly in one clock cycle on a set of rows of the image and the merged kernel to convolve the image with the merged kernel, wherein the MAC and load instructions are executed parallelly in one clock cycle on first and second rows of the set of rows, respectively, such that the second row is subsequent to the first row, and wherein:

executing the MAC instruction comprises executing (i) multiplication and accumulation operations on the first row and a first coefficient of the merged kernel, and (ii) a logical shift operation on the merged kernel.

13. The method of claim 12, wherein executing the load instruction comprises:

loading, by a load-store circuit of the processing circuitry, the merged kernel in a weight register of the processing circuitry for storing the merged kernel therein; and loading, by the load-store circuit, each row in a corresponding clock cycle in each vector register of a set of vector registers of the processing circuitry for storing the set of rows in the set of vector registers, wherein after the first row is loaded in a first vector register of the set of vector registers in one clock cycle, the second row is loaded in a second vector register of the set of vector registers in a subsequent clock cycle.

14. The method of claim 13, further comprising:

receiving, by a convolution circuit of the processing circuitry, the set of rows and the merged kernel from the set of vector registers and the weight register, respectively, for executing the MAC instruction thereon.

15. The method of claim 14, wherein the multiplication and accumulation operations are executed by a plurality of multipliers and an accumulation register of the convolution circuit, respectively, and wherein the multiplication operation is executed for multiplying each element associated with each row with a corresponding coefficient of the merged kernel to generate pluralities of multiplication outputs, and the accumulation operation is executed to accumulate the pluralities of multiplication outputs in the accumulation register.

16. The method of claim 15, wherein the logical shift operation is executed by a shifter circuit of the convolution circuit on the merged kernel to shift a current coefficient of the merged kernel by replacing the current coefficient with a subsequent coefficient of the merged kernel, when a first plurality of elements associated with the currently loaded row in the vector register are multiplied with the current coefficient.

17. The method of claim 15, wherein when a width of a first vector register of the set of vector registers is 'N' the multiplication and accumulation operations are executed 'N' times in one clock cycle.

18. The method of claim 12, wherein the MAC instruction is executed 'H' times for convolving 'H' rows of the set of rows with 'H' coefficients of the merged kernel, and wherein the 'H' coefficients are associated with a first column of a first kernel of the set of kernels.

19. The method of claim 12, wherein the MAC instruction includes a plurality of instructions in a very long instruction word (VLIW) architecture, and wherein each instruction of the plurality of instructions corresponds to a single instruction multiple data (SIMD) instruction.

20. The method of claim 12, further comprising:

generating, by the processing circuitry, a completion notification when the image is convolved with the merged kernel completely.

* * * * *